(12) United States Patent
Sherrill et al.

(10) Patent No.: US 7,040,460 B1
(45) Date of Patent: May 9, 2006

(54) MECHANIC'S PLATFORM BRAKE ASSEMBLY

(76) Inventors: Allen V. Sherrill, 6927 7th Ave., Rio Linda, CA (US) 95673; Robert W. Ragan, 6927 7th Ave., Rio Linda, CA (US) 95673

( * ) Notice: Subject to any disclaimer, the term of this patent is extended or adjusted under 35 U.S.C. 154(b) by 0 days.

(21) Appl. No.: 10/988,084

(22) Filed: Nov. 15, 2004

(51) Int. Cl.
 *B60T 1/14* (2006.01)
(52) U.S. Cl. ............................ 188/5; 188/19; 188/32
(58) Field of Classification Search .................. 188/5, 188/6, 7, 8, 9, 19, 32
 See application file for complete search history.

(56) References Cited

U.S. PATENT DOCUMENTS

| | | | |
|---|---|---|---|
| 2,851,126 A | 9/1958 | Ward, Jr. | |
| 2,942,693 A | 6/1960 | Johnson | |
| 2,964,327 A * | 12/1960 | Mohr | 280/43.24 |
| 4,244,594 A | 1/1981 | Hines | |
| 4,302,025 A * | 11/1981 | Waddell et al. | 280/79.11 |
| 4,815,569 A | 3/1989 | Norman | |
| 5,323,879 A | 6/1994 | Poulin | |
| 5,431,254 A * | 7/1995 | Kramer et al. | 188/7 |
| D362,529 S | 9/1995 | Hilaire, Jr. et al. | |
| 5,472,219 A | 12/1995 | Eckstrum | |
| 6,076,838 A | 6/2000 | Peterson et al. | |
| 6,095,533 A * | 8/2000 | Balolia | 280/35 |
| 6,843,625 B1 * | 1/2005 | Hewitt | 410/66 |

* cited by examiner

*Primary Examiner*—Devon C. Kramer

(57) ABSTRACT

A mechanic's platform brake assembly includes a housing that has a bottom wall and a peripheral wall with an upper edge defining an opening into the housing. A panel is attached to the upper edge. The bottom wall has an aperture extending therethrough. A block member positioned in the housing is biased toward the opening. An urging member is attached to the panel for selectively urging the block member toward the bottom wall. A leg has a first end and a second end. The first end is coupled to the block member such that the leg extends outwardly through the aperture. A footpad is attached to the second end. A coupler is attached to the housing for removably attaching the housing to a frame of a platform. The block member may be urged toward the bottom wall such that the footpad abuts a ground surface.

8 Claims, 3 Drawing Sheets

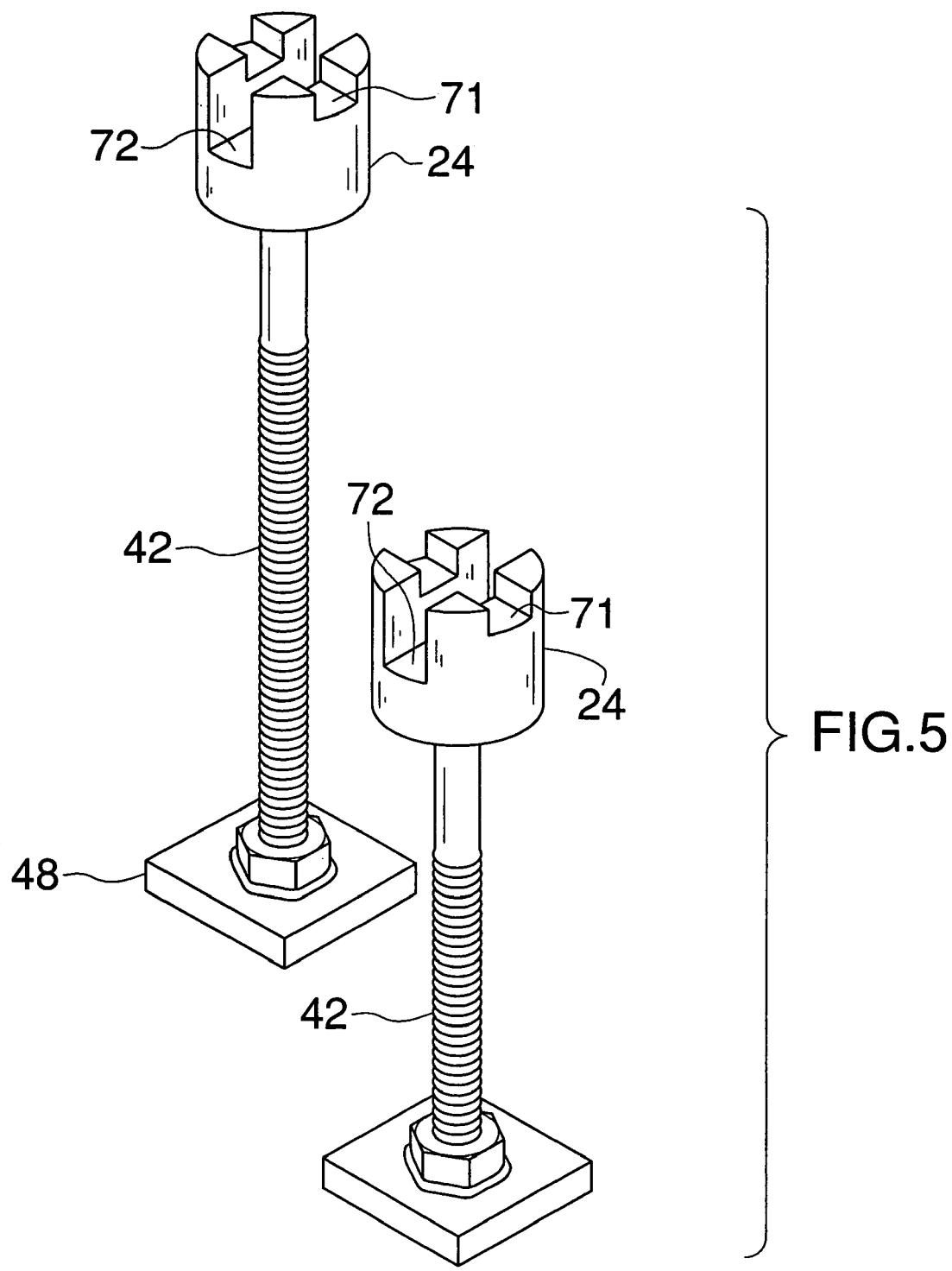

MECHANIC'S PLATFORM BRAKE ASSEMBLY

BACKGROUND OF THE INVENTION

1. Field of the Invention

The present invention relates to wheeled platform braking devices and more particularly pertains to a new wheeled platform braking device for removably positioning on and retrofitting to wheeled platforms, and in particular, mechanic creepers that are used for supporting a mechanic in a wheeled manner so that a mechanic may easily move beneath a vehicle.

2. Description of the Prior Art

The use of wheeled platform braking devices is known in the prior art. U.S. Pat. No. 2,851,126 describes a jack device that is attachable to frame of a carts and the like so that the bottom of the jack may abut a ground surface so that the cart is not easily moveable. Another type of wheeled platform braking device is U.S. Pat. No. 5,323,879 which has a particular construction well suited for large wheeled tool carts and which is well designed for being actuated by foot. Yet another such device is U.S. Pat. No. 2,942,693 that utilizes an actuator positioned on a creeper adjacent to a headrest so that the user of the device may more efficiently engage it.

While these devices fulfill their respective, particular objectives and requirements, the need remains for a brake device that is retrofittable to mechanic creepers and can be selectively positioned on the creeper so that the user of the device can place the brakes where they are most easily reached.

SUMMARY OF THE INVENTION

The present invention meets the needs presented above by generally comprising a housing that has a bottom wall and a peripheral wall that is attached to and extends upwardly from the bottom wall. The peripheral wall has an upper edge defining an opening extending into the housing. A panel is attached to and extends upwardly from the upper edge. The bottom wall has an aperture extending therethrough. A block member is positioned in the housing. A biasing member is positioned in the housing and is adapted for biasing the block member toward the opening. An urging member is attached to the panel for selectively urging the block member toward the bottom wall. A leg has a first end and a second end. The first end is coupled to the block member so that the leg extends through the aperture and outwardly of the housing. A footpad is attached to the second end of the leg. A coupler is attached to the housing for removably attaching the housing to a frame of a platform. The housing may be removably attached to the platform and the block member urged toward the bottom wall such that the footpad abuts a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of the legs of the present invention.

DESCRIPTION OF THE PREFERRED EMBODIMENT

Figure 1:
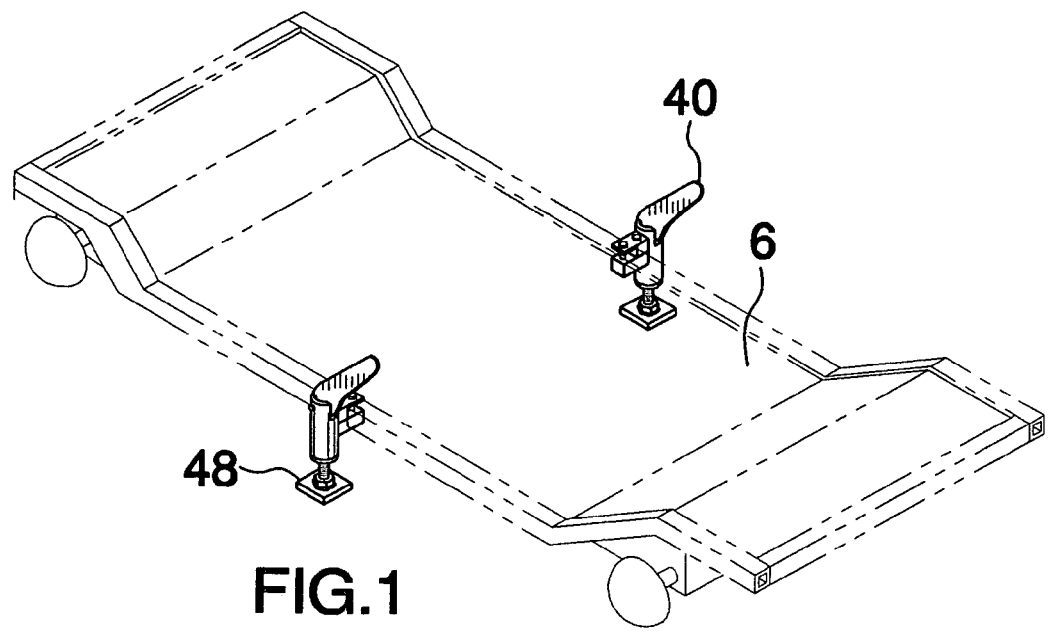
FIG. 1 is a perspective in-use view of a mechanic's platform brake assembly according to the present invention.
Figure 2:
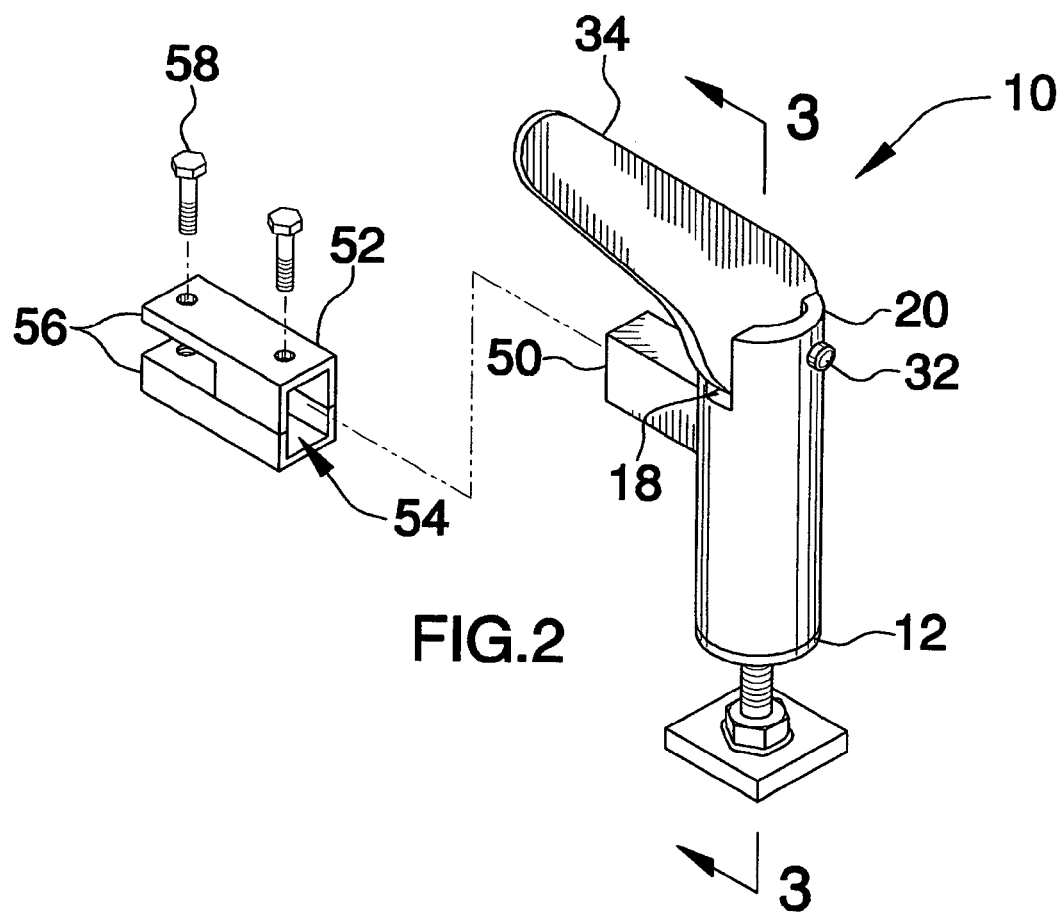
FIG. 2 is a perspective view of the present invention.
Figure 3:
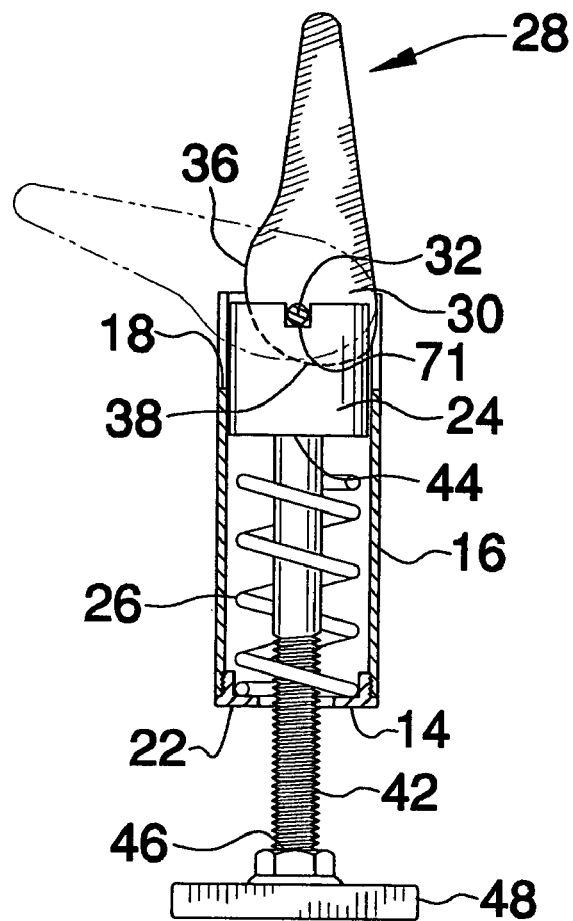
FIG. 3 is a cross-sectional view taken along line 3—3 of FIG. 2 of the present invention.

With reference now to the drawings, and in particular to FIGS. 1 through 5 thereof, a new wheeled platform braking device embodying the principles and concepts of the present invention and generally designated by the reference numeral 10 will be described.

As best illustrated in FIGS. 1 through 5, the mechanic's platform brake assembly 10 generally comprises a device for selectively preventing the movement of a wheeled mechanic's platform 6. The assembly 10 includes a housing 12 having a bottom wall 14 and a peripheral wall 16 that is attached to and extends upwardly from the bottom wall 14. The peripheral wall 16 has an upper edge 18 defining an opening extending into the housing 12. A panel 20 is attached to and extends upwardly from the upper edge 18. The bottom wall 14 has an aperture 22 extending therethrough. A block member 24 is positioned in the housing 12. The block member 24 ideally has the same shape as an interior surface of peripheral wall 16. It is preferred that the housing 12 has a cylindrical shape. The bottom wall 14 may be threadably coupled to the peripheral wall 16 for selectively removing the bottom wall 14 from the housing 12.

A biasing member 26 is positioned in the housing 12 and is adapted for biasing the block member 24 toward the opening, or upper edge 18. The biasing member 26 comprises a spring extending between the bottom wall 14 and the block member 24.

An urging member 28 is attached to the panel 20 for selectively urging the block member 24 toward the bottom wall 14. The urging member 28 includes a cam 30. A pivot rod 32 extends through and rotationally couples the cam 30 to the panel 20 such that a peripheral edge 34 of the cam 30 abuts the block member 24. The cam 30 includes a narrow portion 36 and a bulbous portion 38 with respect to a distance from the pivot rod 32 to the peripheral edge 34. A handle 40 is attached to and extends away from the peripheral edge 34. The narrow portion 36 is positioned between the bulbous portion 38 and the handle 40. The block member 24 is urged toward the bottom wall 14 when the handle 40 is directed upwardly from the housing 12. The block member 24 has a first slot 71 therein for receiving the pivot rod 32 and a second slot 72 therein for receiving the edge 34 of the cam 30.

A leg 42 is elongated and has a first end 44 and a second end 46. The first end 44 of the leg 42 is coupled to the block member 24 so that the leg 42 extends through the aperture 22 and outwardly of the housing 12. The leg 42 may be threaded so that it may be threadably coupled to the block member 24. Preferably, if the leg is threaded, a plurality of the legs 42 is included wherein each of the legs 42 has a different height. A footpad 48 is threadably attached to the second end 46 of the leg 42. If a plurality of legs 42 is provided, then a plurality of footpads 48 is provided and each of the footpads 48 is attached to one of the second ends 46 of the legs 42. The footpads 48 are preferably comprised of a non-skid material such as an elastomer. The bottom wall 14 may be removed from the housing 12 to remove the leg 42 and its attached block member 24 so that a new block member 24 having a differently sized leg 42 may be positioned in the housing 12.

A coupler is attached to the housing 12 for removably attaching the housing 12 to a frame 7 of the mechanic's platform 6, which is conventionally known as a mechanic's creeper. The coupler includes a post 50 that is attached to and extends away from the peripheral wall 16 of the housing 12. The post 50 is selectively extended into the frame 7 of the platform 6. If no opening is provided in the frame 7 for receiving the post 50, a bracket 52 is also included. The bracket 52 is removably attached to the post 50 so that the bracket 52 may be selectively attached to the frame 7. The bracket 52 includes a sleeve 54 adapted for receiving the post 50. A pair of spaced arms 56 is attached to and extends away from the sleeve 54. The frame 7 may be positioned between the arms 56. Securing members 58 are selectively extended through the arms 56 and into the frame 7. The securing members 58 may also be extended through the frame 7 and into the post 50 if only the post 50 is utilized. The sleeve 54 may be comprised of a top section and a bottom section that are attached together with fasteners for facilitating the attachment of the sleeve 54 to the platform 6.

Figure 4:
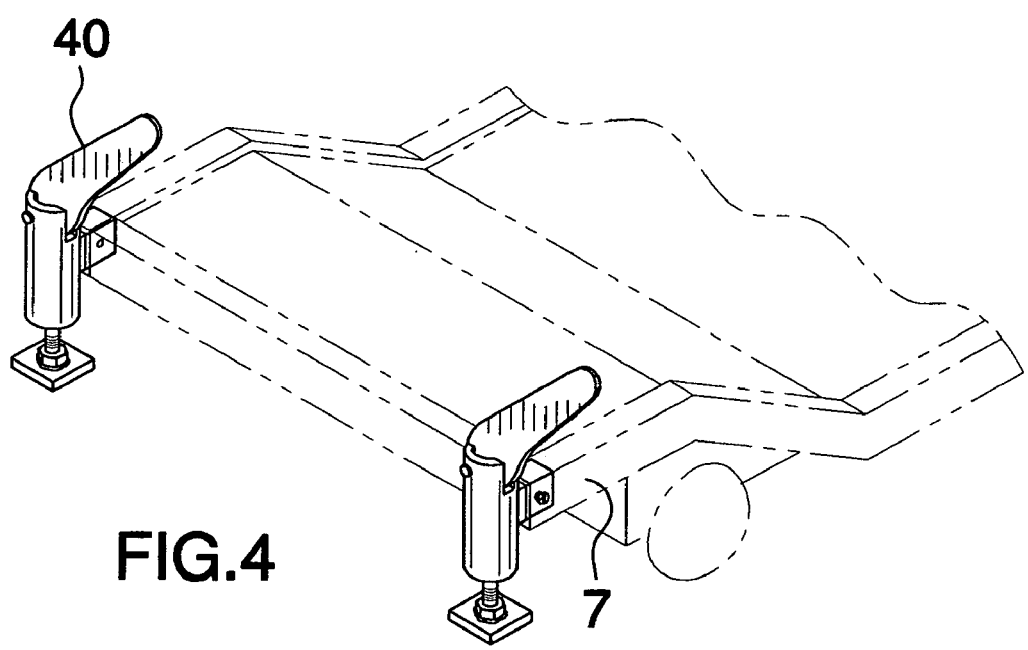
FIG. 4 is a perspective view of the present invention.

In use, at least two of the assemblies 10 are preferably used as shown in FIGS. 1 and 4. Initially, the correct leg 42 is chosen for the height needed with respect to the frame 7. The same sizes legs 42 are used for both assemblies 10. The heights of the legs 42 preferably vary between two inches and six inches. The legs 42 are chosen depending on the height of the frame 7 with respect to the ground surface. The housings 12 are removably attached to the platform 6. When the user of the platform 6 wishes to prevent its movement along the ground surface, the block member 24 is urged toward the bottom wall 14 so that the associated one of the footpads 48 abuts the ground surface. The friction between the footpad 48 and the ground surface hinders movement of the platform 6 across the ground surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A brake assembly for removably mounting on a wheeled mechanic platform, said assembly including:
    a housing having a bottom wall and a peripheral wall being attached to and extending upwardly from said bottom wall, said peripheral wall having an upper edge defining an opening extending into said housing, a panel being attached to and extending upwardly from said upper edge, said bottom wall having an aperture extending therethrough;
    a block member being positioned in said housing;
    a biasing member being positioned in said housing and being adapted for biasing said block member toward said opening;
    an urging member being attached to said panel for selectively urging said block member toward said bottom wall, said urging member including a cam, a pivot rod extending through and rotationally coupling said cam to said panel such that a peripheral edge of said cam abuts the block member, said cam including a narrow portion and a bulbous portion with respect to a distance from said pivot rod to said peripheral edge;
    a leg having a first end and a second end, said first end being coupled to said block member such that said leg extends through said aperture and outwardly of said housing;
    a footpad being attached to said second end of said legs;
    a coupler being attached to said housing for removably attaching the housing to a frame of the platform; and
    wherein the housing may be removably attached to the platform and said block member urged toward the bottom wall such that the footpad abuts a ground surface.

2. The assembly according to claim 1, wherein said biasing member comprises a spring extending between said bottom wall and said block member.

3. The assembly according to claim 1, further including a handle being attached to and extending away from said peripheral edge, said narrow portion being positioned between said bulbous portion and said handle, wherein said block member is urged toward said bottom wall when said handle is directed upwardly from said housing.

4. The assembly according to claim 1, wherein said coupler includes a post being attached to and extending away from said peripheral wall of said housing, said post being selectively extended into the frame of the platform.

5. The assembly according to claim 1, wherein said coupler includes a post being attached to and extending away from said peripheral wall of said housing, a bracket being removably attached to said post, said bracket being adapted for being removably attachable to the frame, said bracket including a sleeve adapted for receiving the post, a pair of spaced arms being attached to and extending away from said sleeve, wherein the frame may be positioned between said arms, securing members being selectively extended through the arms and into the frame.

6. The assembly according to claim 3, wherein said coupler includes a post being attached to and extending away from said peripheral wall of said housing, said post being selectively extended into the frame of the platform.

7. The assembly according to claim 3, wherein said coupler includes a post being attached to and extending away from said peripheral wall of said housing, a bracket being removably attached to said post such that said bracket may be selectively attached to the frame, said bracket including a sleeve adapted for receiving the post, a pair of spaced arms being attached to and extending away from said sleeve, wherein the frame may be positioned between said arms, securing members being selectively extended through the arms and into the frame.

8. A brake assembly for removably mounting on a wheeled mechanic platform, said assembly including:
    a housing having a bottom wall and a peripheral wall being attached to and extending upwardly from said bottom wall, said peripheral wall having an upper edge defining an opening extending into said housing, a panel being attached to and extending upwardly from said upper edge, said bottom wall having an aperture extending therethrough;

a block member being positioned in said housing;

a biasing member being positioned in said housing and being adapted for biasing said block member toward said opening, said biasing member comprising a spring extending between said bottom wall and said block member;

an urging member being attached to said panel for selectively urging said block member toward said bottom wall, said urging member including a cam, a pivot rod extending through and rotationally coupling said cam to said panel such that a peripheral edge of said can abuts the block member, said cam including a narrow portion and a bulbous portion with respect to a distance from said pivot rod to said peripheral edge, a handle being attached to and extending away from said peripheral edge, said narrow portion being positioned between said bulbous portion and said handle, wherein said block member is urged toward said bottom wall when said handle is directed upwardly from said housing;

a plurality of legs, each of said legs being elongated and having a first end and a second end, said first end of one of said legs being removably coupled to said block member such that said leg extends through said aperture and outwardly of said housing, each of said legs having a different height, each of said legs being leaded such that said legs may be threadably coupled to said block member;

a plurality of footpads, each of said footpads being attached to at least one of said second ends of said legs;

a coupler being attached to said housing for removably attaching the housing to a frame of the platform, said coupler including a post being attached to and extending away from said peripheral wall of said housing, a bracket being removably attached to said post, said bracket being adapted for being removably attachable to the frame, said bracket including a sleeve adapted for receiving the post, a pair of spaced arms being attached to and extending away from said sleeve, wherein the frame may be positioned between said arms, securing members being selectively extended through the arms and into the frame; and wherein the housing may be removably attached to the platform and said block member urged toward the bottom wall such that an associated one of the footpads abuts a ground surface.

* * * * *